Patented Mar. 21, 1939

2,151,241

UNITED STATES PATENT OFFICE 2,151,241

PROCESS OF IMPROVING THE PROPERTIES OF CONDENSATION PRODUCTS OF HIGH MOLECULAR SPLIT-OFF PRODUCTS OF ALBUMIN WITH HIGHER FATTY ACIDS AS COSMETIC PRODUCTS

Fritz Sommer, Berlin-Charlottenburg, and Max Nassau, Berlin-Wilmersdorf, Germany, assignors to the firm Chemische Fabrik Grünau, Landshoff & Meyer A. G., Berlin-Grunau, Germany, a company of Germany No Drawing. Application May 4, 1936, Serial No. 77,786. In Germany November 4, 1935

13 Claims. (Cl. 167—90)

This invention relates to condensation products of high molecular split-off products of albumin with higher fatty acids and more particularly to a process of rendering said products better adapted for cosmetic purposes.

The condensation products of high molecular split-off products of albumin of the type of lysalbinic and protalbinic acids with higher fatty acids and a process for their production are described in U. S. Patent 2,015,912, granted to Fritz Sommer, while our Patent No. 2,100,090, relates to the utilization of said products for cosmetic products.

It has been found that the condensation products of high molecular split-off products of albumin of the type of lysalbinic and protalbinic acids with higher fatty acids, owing to their method of production, frequently contain impurities which do not interfere with the commercial use of said products, but which prove troublesome in their utilization for cosmetic purposes. Hence, it is mainly a matter of eliminating those impurities which affect the odour of the products and cause the stickiness of the raw products. The chemical nature of these impurities has not been closely investigated. Partly, they may be starting materials which have not entered into reaction, partly by-products of the condensation reaction.

In a broad aspect our invention comprises improving the properties of the condensation products of high molecular split-off products of albumin with higher fatty acids for cosmetic purposes by purifying said condensation products by precipitation from the solutions of their alkali metal salts.

The condensation products of high molecular split-off products of albumin with higher fatty acids are produced by reacting the split-off products of albumin with the chlorides of higher fatty acids in alkaline solution, as described in U. S. Patent 2,015,912. The aqueous solutions of the alkali metal salts of the condensation products will thus be obtained directly.

The condensation products of high molecular split-off products of albumin with higher fatty acids are so-called amphoteric electrolytes, i. e. they are able to form salts both with alkali and acids. Nevertheless, the solubility of the condensation products of high molecular split-off products of albumin with higher fatty acids in acid solution is considerably smaller than in alkaline solution. Accordingly, upon adding acids to concentrated aqueous solutions of the alkali metal salts of the condensation products of high molecular split-off products of albumin with higher fatty acids, the condensation products will be precipitated.

If the precipitation of the condensation products is carried out in such a way that a strong acid such as hydrochloric acid or sulfuric acid is added at ordinary temperature to solutions, e. g. of 10%, of the condensation products the latter will be obtained as a semi-solid precipitate which retains larger amounts of the solution in the form of an emulsion. A complete purification of the condensation products is thereby prevented.

As a preferred embodiment of our present invention the precipitation of the condensation products is effected under conditions which cause the condensation products to be transformed into the liquid state.

This can be done in various ways. Transformation of the precipitate into the liquid state, in the first place, will be favoured by raising the temperature, but even at 100° C. the precipitate usually has not melted yet to a clear liquid. Thus even by carrying out the precipitation at the boiling point of the solution the desired effect will not be readily secured. However, raising the boiling point by using increased pressure will ensure a higher temperature and the complete transformation of the precipitate into the liquid state.

Another way of effecting the transformation of the precipitate into the liquid state comprises adding substances which will lower the melting point of the precipitate. As it is advantageous to use a minimum of these admixtures, there will preferably be employed substances a small quantity of which will effect liquefaction of the precipitate and which, on the other hand, will not prove troublesome during the later steps of the process. Rather, they may be desirable, e. g. in view of their acting as disinfectants.

It has been established by numerous experiments that many organic solvents, for instance, have the desired effect of lowering the melting point of the precipitate. Apart from organic solvents insoluble or difficultly soluble in water, such as aromatic hydrocarbons (toluene), higher alcohols (butanol), higher ketones (camphor), higher phenols ($\beta$-naphthol), halogenated hydrocarbons (chloroform, trichlorethylene, etc.), ethers (ethyl ether, diphenylene oxide), nitrated hydrocarbons (nitrobenzene, nitrotoluene) and numerous other organic compounds, there can be used for this particular purpose water soluble organic solvents, such as acetone, ethanol. Comparatively small amounts of alcohol will effect the desired liquefaction of the precipitate.

Apart from the substances mentioned above, there have proved useful in lowering the melting point of the precipitate organic acids, such as higher fatty acids, sulfonic acids, such as the naphthalene sulfonic acids, and carboxylic acids, such as benzoic acid. In this respect it has to be remembered that, unless special measures be taken, the added substance will partly remain in the precipitated liquid phase or in the solutions or solid products obtained therefrom. In using benzoic acid, for instance, for lowering the melting point of the precipitate a preservative effect will be secured in addition.

While in precipitating the condensation products of higher fatty acids and split-off products of albumin in a solid or semi-liquid form, an effective purification can be attained only with difficulty, the process is considerably simplified by effecting the liquefaction of the precipitate by means of one of the substances enumerated above. Thereafter, separation can be carried out by decantation and subsequent washing with water, if desired. Other mechanical methods of separating the two liquid phases, e. g. by using a separating funnel, may be readily applied.

Repeated re-precipitation of the condensation products by re-dissolving them in alkali and adding acid again may usually be dispensed with. The solutions obtained by dissolving in alkali the precipitates purified as described above meet all practical requirements, as far as the degree of purity is concerned. In the manner described above there are obtained non-sticky, nearly odourless preparations which, depending on their concentration and the presence of admixtures, will form pastes or clean coloured oils which are miscible with water in all proportions. By controlling the amount of alkali there may be obtained water soluble products of alkaline, neutral, or slightly acid reaction, as desired. Owing to the absence of troublesome impurities the purified products show improved properties as compared with the technical products. The products obtained in accordance with the invention are particularly adapted for cosmetics, disinfectants and for all those purposes where pure products are valued.

Sometimes it is preferred not to dissolve the condensation products of high molecular split-off products of albumin with higher fatty acids in alkali but in organic bases. In this way solutions are obtained which are completely free from alkali. By controlling the quantity of the organic base, neutral, slightly acid or alkaline solutions may be obtained, this being of great importance for cosmetic purposes as slightly acid or neutral solutions are frequently preferred. For the purposes of the present invention, organic bases the organic residues of which contain hydroxy groups, e. g. the ethanolamines, are particularly adapted. In using triethanolamine, for instance, there is obtained a solution of the condensation products of high molecular split-off products of albumin with higher fatty acids which is particularly adapted for cosmetic purposes.

Another advantage of purifying the condensation products of high molecular split-off products of albumin with higher fatty acids in accordance with the invention resides in the fact that there may easily be obtained in that way dry preparations containing the condensation products of high molecular split-off products of albumin with higher fatty acids.

In evaporating or atomizing the solutions of the alkali salts of the condensation products of high molecular split-off products of albumin with higher fatty acids to dryness, there will be obtained highly hygroscopic and sticky masses. Neither does mixing these dry preparations with calcined salts result in stable dry preparations. However, the liquid precipitates obtained by adding acid to the solutions of the alkali salts of the condensation products can easily be converted into stable dry preparations. With this object in view, these liquid precipitates are added to calcined salts, preferably together with a small quantity of water which is smaller than the water binding capacity of the calcined salts. A non-hygroscopic, non-caking dry preparation is hereby obtained. It is understood that the term "calcined salts" used in the specification and claims has reference to salts, which are liberated from their contents of crystal water and are adapted to bind water. When using calcined salts showing an alkaline reaction the dry preparations will dissolve in water to form clear solutions. In order to obtain not too strongly alkaline it is preferred to use calcined salts of slightly alkaline reaction, such as calcined borax or anhydrous sodium pyrophosphate. Salts of a stronger alkaline reaction, such as calcined sodium carbonate, however, may be used as well.

In suitably controlling the ratio of condensation products and calcined salts, there may be obtained dry preparations the aqueous solutions of which will show a neutral or slightly acid reaction. Generally, the quantity of calcined salt added is 2 to 5 times the quantity of condensation products to be converted into dry preparations.

The dry preparations of condensation products of high molecular split-off products of albumin with higher fatty acids are likewise preferably used for cosmetic purposes; besides, they are adapted for numerous other purposes, e. g. as disinfectants or washing materials for domestic and industrial use.

In the following specific examples we have set forth several of the preferred embodiments of our invention, but they are presented only for purposes of illustration and are not to be regarded as limitations.

*Example 1*

By reacting coconut oil acid chloride with a 50% solution of split-off products of albumin of the lysalbinic acid and protalbinic acid type in alkaline solution there is obtained a raw product containing 30% of condensation products. The resultant mass is a dark brown, turbid, sticky syrup. It has the typical odour of split-off products of albumin. After adding three times the amount of water and heating to the boil, precipitation is effected by acidifying with hydrochloric acid. The precipitate obtained is of semi-liquid consistency and can be separated from the supernatant solution only incompletely.

By adding, prior to or after the precipitation, 3% of benzoic acid, based on the commercial raw condensation product, there is effected a complete liquefaction of the precipitate which can be separated from the supernatant aqueous solution by decantation without difficulty.

The product thus obtained can then be worked up, by means of potassium hydroxide, to form a clear oil which is nearly odourless, shows a slightly acid reaction, is soluble in water and possesses a very high lather forming capacity.

*Example 2*

To a solution of the commercial raw product of Example 1 in double the amount of water there is added enough sulfuric acid, of 1.4 specific gravity, to just effect precipitation. The mixture is heated at about 120° C. in a lead-lined autoclave, whereby the precipitate is liquefied. It collects at the bottom and can be separated from the supernatant acid liquid practically completely.

Example 3

The condensation product of the chloride of the fatty acids of palm kernel oil and high molecular split-off products of albumin is prepared, diluted with three times the amount of water, heated to the boil and precipitated with hydrochloric acid in the presence of 1 to 5% of the following substances whereby liquefaction occurs:

Toluene, diphenyl, camphor,
p-Nitrotoluene, nitrobenzene,
Ethanol, butanol, fusel oil, β-naphthol,
Chloroform, trichlorethylene,
Ethyl ether, diphenylene oxide,
Propyl naphthalene sulfonic acid, α-naphthalene sulfonic acid,
Phenacetin,
Ricinoleic acid.

Example 4

The raw condensation product obtained from the chloride of the acids of tall oil and high molecular split-off products of albumin is purified by precipitation, while hot, with acid in the presence of 5% ethanol, whereby liquefaction occurs. The acid water is separated.

Example 5

The condensation product prepared in accordance with Example 1 and separated from the acid solution is stirred with so much triethanolamine dissolved in a little water as to form a solution of slightly acid reaction. The product is a hairwash of high lather forming capacity, absolute lime resistance and mild physiological effect.

Example 6

By reacting the chloride of the fatty acids of soy bean oil with split-off products of the protalbinic acid and lysalbinic acid type a commercial preparation is obtained, as described in Example 1. The pure condensation product will be precipitated therefrom in liquid form by adding an acid in the presence of a small amount of α-naphthalene sulfonic acid. The pure condensation product is stirred with so much caustic potash solution as to make it soluble in water. It can be used as a constituent of solutions for permanent waving, toothpastes, creams and the like.

Example 7

The condensation product prepared according to Example 1 and separated from the acid solution is stirred with three times the amount, by weight, of calcined borax. After grinding, a dry powder is obtained which, admixed with pulverized soap, gives hairwash powders of high lime resistance.

Example 8

The condensation product in accordance with Example 4 is intimately stirred with five times the amount of anhydrous sodium pyrophosphate and a small quantity of water. A pulverulent mixture is obtained which is stable in contact with the air. 20 parts of this mixture and 80 parts sodium perborate give a stable preparation which is utilized for washing and bleaching purposes, e. g. for living hair.

Example 9

The condensation product precipitated in accordance with Example 1, while adding α-naphthalene sulfonic acid, is mixed with so much calcined sodium carbonate that there is formed a powder which is capable of being poured and which is stable in contact with the air. To the above may be added several times the amount of pulverized soap without the formation of troublesome lime soaps.

Having particularly described our invention, what we claim is:

1. A process for improving the properties of condensation products of high molecular split-off products of albumin of the type of lysalbinic and protalbinic acids with higher fatty acids for use in cosmetic products which comprises purifying said condensation products by precipitating the concentrated aqueous solutions of their alkali metal salts by adding a strong acid.

2. A process for improving the properties of condensation products of high molecular split-off products of albumin of the type of lysalbinic and protalbinic acids with higher fatty acids for use in cosmetic products which comprises purifying said condensation products by precipitating the concentrated aqueous solutions of their alkali metal salts by adding a strong acid, while simultaneously transforming the precipitate into the liquid state by increasing the temperature during the precipitation.

3. A process for the production of aqueous solutions of the condensation products of high molecular split-off products of albumin of the type of lysalbinic and protalbinic acids with higher fatty acids, said condensation products being purified by precipitation, which comprises re-dissolving the precipitate in aqueuos alkaline solutions.

4. A process for the production of aqueous, alkali-free solutions of the condensation products of high molecular split-off products of albumin of the type of lysalbinic and protalbinic acids with higher fatty acids, said condensation products being purified by precipitation, which comprises re-dissolving the precipitates in ethanol amines.

5. A process for the production of aqueous, alkali-free solutions of the condensation products of high molecular split-off products of albumin of the type of lysalbinic and protalbinic acids with higher fatty acids, said condensation products being purified by precipitation, which comprises re-dissolving the precipitates in triethanolamine.

6. A process for improving the properties of condensation products of high molecular split-off products of albumin of the type of lysalbinic and protalbinic acids with higher fatty acids for use in cosmetic products, comprising the steps of purifying said condensation products by the precipitation of the concentrated aqueous solutions of their alkali metal salts by adding a strong acid, and liquefying the precipitate simultaneously with the formation thereof.

7. A process for improving the properties of condensation products of high molecular split-off products of albumin of the type of lysalbinic and protalbinic acids with higher fatty acids for use in cosmetic products, comprising the steps of purifying said condensation products by the precipitation of the concentrated aqueous solutions of their alkali metal salts by adding a strong acid, and liquefying the precipitate simultaneously with the formation thereof by dissolving in the precipitate 1-5% of an organic substance to lower the melting point thereof.

8. A process for improving the properties of condensation products of high molecular split-off products of alubumin of the type of lysalbinic and protalbinic acids with higher fatty acids for use in cosmetic products, by the precipitation of the concentrated aqueous solutions of their alkali metal salts by adding a strong acid, and liquefying the precipitate simultaneously with the formation thereof by increasing the temperature during the precipitation and by dissolving in the precipitate 1-5% of an organic substance to lower the melting point thereof.

9. Dry preparations suitable as cosmetic products which comprise condensation products of high molecular split-off products of albumin of the type of lysalbinic and protalbinic acids with higher fatty acids, and calcined borax.

10. Dry preparations suitable as cosmetic products which comprise condensation products of high molecular split-off products of albumin of the type of lysalbinic and protalbinic acids, and anhydrous sodium pyrophosphate.

11. Dry preparations suitable as cosmetic products which comprise condensation products of high molecular split-off products of albumin of the type of lysalbinic and protalbinic acids, and calcined sodium carbonate.

12. Dry preparations suitable as cosmetic products which comprise condensation products of high molecular split-off products of albumin of the type of lysalbinic and protalbinic acids with higher fatty acids, and salts liberated from their contents of crystal water and selected from the group consisting of calcined borax, anhydrous sodium pyrophosphate and sodium carbonate.

13. Dry preparations as claimed in claim 12, in which the amount of the salts admixed to the condensation products amounts to about 2-5 times the amount of said condensation products.

FRITZ SOMMER.
MAX NASSAU.